Jan. 14, 1958
E. STUMP
2,819,626
MOTION-TRANSMITTING MECHANISM FOR A SPEED
CHANGE TRANSMISSION OF A MOTOR VEHICLE
Filed Jan. 10, 1956
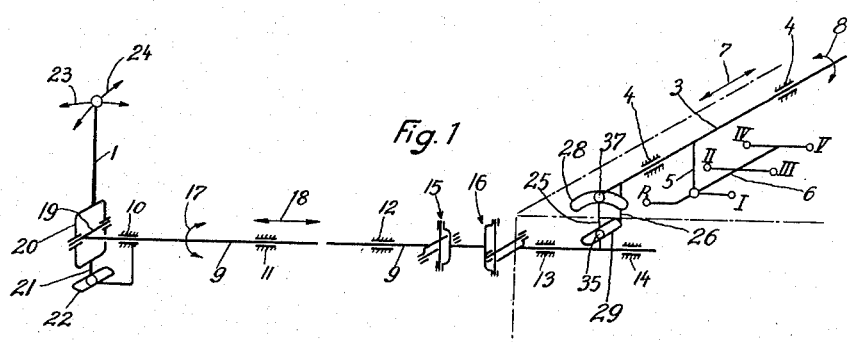
Fig. 1
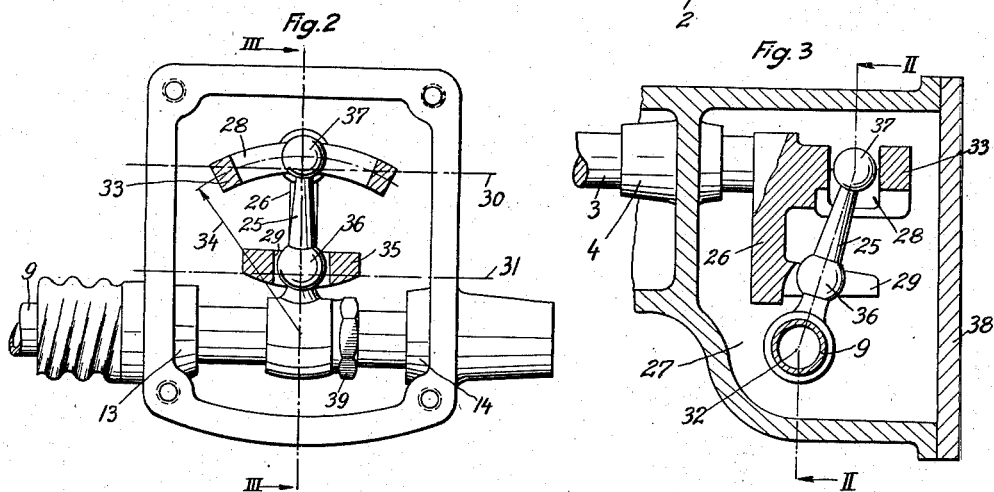
Fig. 2
Fig. 3
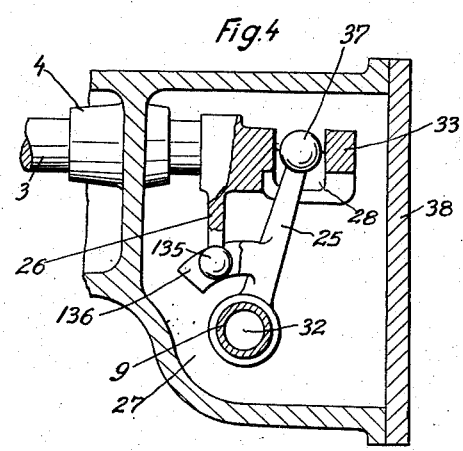
Fig. 4
Inventor
EUGEN STUMP
BY Dicks and Craig
ATTORNEYS.

United States Patent Office 2,819,626
Patented Jan. 14, 1958

2,819,626

MOTION-TRANSMITTING MECHANISM FOR A SPEED CHANGE TRANSMISSION OF A MOTOR VEHICLE

Eugen Stump, Stuttgart-Unterturkheim, Germany, assignor to Daimler-Benz Aktiengesellschaft, Stuttgart-Unterturkheim, Germany Application January 10, 1956, Serial No. 558,320

Claims priority, application Germany January 15, 1955

3 Claims. (Cl. 74—473)

My invention relates to a motion-transmitting mechanism which connects a gear shift lever to a remote speed change transmission of a motor vehicle and, more particularly, to gear shifting means of a motor vehicle in which the speed change transmission is disposed remote from the driver's seat, such arrangement requiring that the gear-selecting and shifting movement be transferred from the gear shift lever operable by the driver to a selector shaft or rod associated with the transmission and connected with actuating fingers adapted to actuate and shift the gear shifting yokes in the transmission. Preferably, the motion-transmitting means include a rotatably and shiftably mounted shaft.

Where the speed change transmission is spaced a distance of from 20 to 25 feet from the driver's seat, as is true for instance in busses with the engine mounted in the rear, the driver cannot clearly hear and be guided by the noises produced incidentally to the actuation of the clutch and of the speed change transmission and, therefore, is liable to encounter difficulties in actuating the gear shift lever unless the motion-transmitting mechanism connecting the gear shift lever with the speed change transmission operates so smoothly and with so little friction as to enable the driver in handling the gear shift lever to sense the gear-selecting and gear-shifting motions produced and, more particularly, the timing of the synchronization.

Therefore, it is an object of my invention to provide an improved motion-transmitting mechanism of the character described involving a minimum of friction and being thus capable of easy and smooth actuation. More particularly, it is an object of the present invention to provide improved means for the transfer of rotary and lengthwise displacement of a shaft operable by the gear shift lever to a second shaft disposed in the speed change transmission, such means reducing the bearing forces set up coincidentally to the shifting operation to a minimum.

Further objects of my invention will appear from the detailed description following hereinafter of two preferred embodiments of my invention, it being understood that the terminology used in such detailed description has been chosen for the purpose of illustrating the invention rather than limiting the same, the features of novelty for which patent protection is sought being pointed out in the appended claims.

In the drawings:

Fig. 1 is a diagrammatic perspective view of a gear shift lever and a speed change transmission housing disposed remote from each other and of my novel motion-transmitting mechanism arranged therebetween;

Fig. 2 is a vertical sectional view of the motion-transmitting mechanism, the section being taken along the broken line II—II shown in Fig. 3;

Fig. 3 is a sectional view taken along the line III—III of Fig. 2 and

Fig. 4 is a sectional view similar to that of Fig. 3 of a modified embodiment of my invention.

In Fig. 1 I have shown a gear shift lever 1 disposed at a considerable distance from a speed change transmission 2 of a motor vehicle. The transmission is of the type capable of being shifted to five forward speeds and one reverse speed. For performing the gear shifting operation, the transmission is provided with a shaft 3 which is rotatably and slidingly mounted in bearings 4 of the transmission housing and is provided with a downwardly extending finger 5 adapted to engage a guideway 6 extending parallel to shaft 3. For the purpose of selecting a transmission element to be actuated, shaft 3 may be moved in the direction of its axis indicated by arrow 7, such movement being effected by the mechanism to be described hereinafter, to thereby bring finger 5 into registry with any one of a plurality of transverse guideways R, I, II, III, IV and V which extend laterally from the main guideway 6. For effecting the actuation of the selected element, shaft 3 must be turned in one direction or the other indicated by arrow 8, such turning movement being effected by the mechanism to be described hereinafter, thus causing the finger 5 to enter the preselected transverse guideway. A more detailed disclosure of the transmission 2 is deemed dispensable since the transmission is well known in the art and does not form part of my invention.

In order to effect the described operation of shaft 3 by means of the remote gear shift lever 1 a second shaft 9 is provided which extends from the transmission 2 transversely to the actuating shaft 3 thereof forwardly towards the gear shift lever 1 and is journalled in bearings 10, 11, 12, 13 and 14 for rotation and lengthwise displacement. If desired, the shaft 9 may be subdivided in a plurality of sections interconnected by universal joints 15 and 16 adapted to transmit both the rotation and the lengthwise displacement from one shaft section to the other. Suitable means are provided which so connect shaft 9 to the gear shift lever 1 as to enable the driver by suitable manipulation of the lever 1 to either turn shaft 9 about its axis in one or the opposite direction, as indicated by arrow 17, or alternatively to shift the shaft 9 in axial direction one way or the other, as indicated by arrow 18. In the embodiment shown, such means comprises a pivot pin 19 fixed to shaft 9 and extending transversely thereto and a frame 20 rigidly connected with the gear shift lever 1 and fulcrumed on the transverse pivot pin 19 and provided with a downwardly extending finger 21. The lower end of finger 21 is provided with a spherical portion engaging a horizontal guideway 22 fixed to the structure of the vehicle and extending transversely to shaft 9. By rocking the gear shift lever 1 forwardly or rearwardly, as indicated by arrow 23, the driver may thus tilt frame 20 about the spherical end of its finger 21 forwardly or rearwardly thereby imparting a corresponding displacement to the pivot pin 19 and the shaft 9 connected therewith. Alternatively, the driver may rock the gear shift lever 1 to the right or to the left, as indicated by arrow 24, thereby oscillating the frame 20 about the axis of shaft 9 imparting a similar oscillation to the shaft, as indicated by arrow 17.

Thus it will appear that the driver by swinging the gear shift lever 1 transversely in the direction of arrow 24, he may select any one of the transverse transmission guideways R, I, II, III, IV or V, and by shifting the gear shift lever 1 forwardly or rearwardly in the direction of arrow 23, he may effect the preselected gear shifting operation by causing the finger 5 to engage and actuate the head of the selected yoke of the transmission.

For the purpose of connecting the shaft 9 with the selector shaft 3 I have provided the following mechanism: An arm member 25 is fixed to one of the shafts, for instance to shaft 9, and a bracket member 26 is fixed to the other one of the shafts, for instance shaft 3, for engagement by the arm member 25. One of the members 25, 26 is adapted to be turned by axial displacement of, and to be axially displaced by a turn of the other one of the members 26, 25. In the embodiment shown, it is the arm 25 which, when displaced in the direction of the axis of its shaft 9, turns the bracket 26 and, when turned about the axis of its shaft 9, shifts the bracket 26 and the shaft 3 rigid therewith lengthwise in the direction of arrow 7.

In the embodiment illustrated of my invention in Figs. 2 and 3, the shaft 3 extends through bearing 4 into a housing compartment 27 which surrounds the bracket 26 integral with the end of shaft 3. The bracket is formed with a pair of guideways 28 and 29 which are substantially located in planes indicated by the dash-dotted lines 30 and 31 in Fig. 2. It will be noted that these planes extend parallel to each other and are spaced from each other and from the axis 32 of arm 25. Moreover, it will be noted that one of such guideways, for instance guideway 28, extends parallel to the axis 32 whereas the other one of the guideways, e. g. 29, extends transversely to the axis 32.

The guideway 28 is formed by a slot provided in a substantially horizontal plate 33 projecting from the end of shaft 3 lengthwise thereof. If desired, the plate 33 may be curved so as to be coextensive with the arc of a circle having the radius 34 indicated in Fig. 2. The guideway 29, however, is formed by the slot of a bifurcated member 35 which extends substantially parallel to plate 33 from the lower end of bracket 26. If desired, the lower face of the bifurcated member 35 may be curved so as to conform to an arc of a circle concentric with shaft 3.

The arm 25 which is fixed to the shaft 9 between the bearings 13 and 14 integral with the wall of compartment 27 extends upwardly through the guideway 29 and into the guideway 28 and is provided with spherical portions, the lower spherical portion 36 being disposed within the guideway 29 and the upper spherical portion 37 engaging the upper guideway 28. Preferably, the opposed parallel faces of each guideway 28 and 29 embrace the associated spherical portion 37, or 36 respectively, with a minimum of play or clearance to reduce back lash in the motion-transmitting mechanism connecting gear shift lever 1 to the actuating and selecting finger 5 of the transmission.

The compartment 27 is closed by a removable cover plate 38.

The operation is as follows: A turn imparted to shaft 9 as indicated by the arrow 17 causes spherical member 37 to act on one of the side walls of guideway 28 to thereby shift bracket 26 and shaft 3 lengthwise of the latter. In this operation, the bifurcated member 35 provided with the guideway 29 will slide on the spherical member 36 and will be kept by the latter against any rotation. When a lengthwise displacement is imparted to shaft 9, however, while the shaft is held against rotation, the spherical member 36 of arm 25 will act on the guideway 29 and will thereby rock the bracket 26 and the shaft 3 about the axis of the latter while the spherical portion 37 will slide in the guideway 28 thus securing the bracket 26 and the shaft 3 against displacement along the axis of the latter.

Anyone skilled in the art will readily appreciate that the relationship between each of the spherical members and the associated guideways is capable of reversion. Thus, Fig. 4 illustrates a modified embodiment in which the spherical portion 36 of Fig. 3 has been replaced by a bifurcated lateral projection 136 of arm 25 constituting the guideway whereas the lower end of bracket 26 is provided with a spherical portion 135 substituted for the member 35 shown in Fig. 2. The operation, however, is the same as that described hereinabove.

It will be noted that in the embodiments shown the axes of the shafts 3 and 9 are spaced a distance substantially corresponding to the length of arm 25. This, however, is not a necessary feature of my invention. Owing to the separation in space of the guideways 28 and 29 and owing to the separate functions thereof in their cooperation with the spherical portions 36 and 37 of arm 25, and particularly owing to the disposition of the guideways 29 in proximity to the shaft 9, the forces acting on the bearings 13 and 14 in the gear shifting operation are reduced to a minimum. Therefore, the driver while operating the gear shift lever 1 irrespective of the large distance of the gear shift lever 1 from the transmission 2 will very clearly feel how the gear shifting operation proceeds. Preferably, suitable means, such as a nut 39, are provided to adjust the arm 25 on the shaft 9.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Motion-transmitting mechanism for connecting a gear shift lever to a remote speed change transmission of a motor vehicle, comprising a pair of shafts extending transversely to each other, one of said shafts being connected to said gear shift lever for rotation and lengthwise displacement, the other shaft being mounted rotatably and slidingly in said transmission and adapted to select gears therein by lengthwise displacement and to shift said selected gears by rotary displacement, an arm member fixed to one of said shafts, a bracket member fixed to the other one of said shafts for engagement by said arm member, one of said members being adapted to be turned by axial displacement of and to be axially displaced by a turn of the other one of said members, said bracket member being formed with a pair of guideways substantially located in planes extending parallel to and being spaced from each other and the axis of said arm, one of said guideways extending parallel to and the other one of said guideways extending transversely to said axis, said arm member engaging each of said guideways.

2. Motion-transmitting mechanism for connecting a gear shift lever to a remote speed change transmission of a motor vehicle, comprising a pair of shafts extending transversely to each other, one of said shifts being connected to said gear shift lever for rotation and lengthwise displacement, the other shaft being mounted rotatably and slidingly in said transmission and adapted to select gears therein by lengthwise displacement and to shift said selected gears by rotary displacement, an arm member fixed to one of said shafts, a bracket member fixed to the other one of said shafts for engagement by said arm member, one of said members being adapted to be turned by axial displacement of and to be axially displaced by a turn of the other one of said members, said arm member being provided with spherical portions spaced from each other and from the axis of said arm member, said bracket member being formed with spaced guideways each extending substantially parallel to one of said shafts and accommodating one of said spherical portions.

3. Mechanism as claimed in claim 2 in which one of said guideways which extends parallel to said shaft fixed to said bracket member is open at the end remote from said shaft.

References Cited in the file of this patent

UNITED STATES PATENTS 2,390,711 Holmstrom _____ Dec. 17, 1945